United States Patent Office 3,333,008
Patented July 25, 1967

3,333,008
PROCESS FOR PRODUCING THIOETHERS
André Lang, Pau, and Paul Vannel, Lagor, France, assignors to Societe Nationale des Petroles d'Aquitaine, Paris, France, a corporation of France
No Drawing. Filed July 1, 1964, Ser. No. 379,712
Claims priority, application France, July 5, 1963, 940,573
7 Claims. (Cl. 260—609)

This invention relates to a process for producing thioethers and, more particularly, to the production of alkyl thioethers, i.e., straight-chain or branched dialkyl monosulphides, of the general formula R—S—R', in which the alkyl groups R and R' may be similar or different, a specific example of which is ethyl sulphide.

Thioethers can be produced by various well-known methods, particularly by the condensation of olefines with hydrogen sulphide. The techniques which have been used in this type of reaction utilize the property of the olefines of combining with the $H_2S$, in the presence of various catalysts, to give mercaptans and alkyl sulphides. In these previously-known processes, the reaction generally takes place in the gaseous phase, at a temperature from 200 to 300° C.; however, it has been found that the conversion rates are not very high, particularly in the case of ethylene. Another disadvantage of the prior art is that the sulphidts which are formed are absorbed by the catalyst and inhibit the action of the latter. While it is true that raising the temperature assists the desorption, it has the effect of displacing the equilibrium in the inverse sense. In the most favorable cases, the alkyl suphide obtained is always contaminated with mercaptans. It is also necessary with the known processes to have rather pure reagents in order to avoid the dangers of the catalyst becoming poisoned.

It is, therefore, an outstanding object of the invention to provide a process for the production of thioethers in which the rate of conversion is higher than with previously-known processes.

Another object of this invention is the provision of a process for the production of thioethers in which hydrogen sulphide may be used in an impure form, such as industrial gas originating in refineries or in natural gas wells, without affecting the product.

A further object of the present invention is the provision of a process for producing thioethers wherein it is possible to employ a gas which contains large proportions of $CO_2$ without affecting the conversion rate or the purity of the product obtained.

It is another object of the instant invention to provide a process for producing thioethers in which the sulphides are not absorbed by the catalyst and, therefore, do not inhibit the latter.

It is a further object of the invention to provide a process for producing thioethers in which the product is not contaminated with mercaptans.

With the foregoing and other objects in view, which will appear as the description proceeds, the invention resides in the combination and arrangement of steps and in the details of operation hereinafter described and claimed, it being understood that changes in the precise embodiment of the invention herein disclosed may be made within the scope of what is claimed without departing from the spirit of the invention.

In general, the process of the invention consists in causing one or more olefines to react with hydrogen sulphide in the liquid phase in the presence of sulphur and a catalyst selected from known vulcanization agents. The operation takes place under a pressure sufficient for the reaction medium to remain liquid.

Another feature of the invention is that the reactional liquid phase contains a solvent of the thioether (or thioethers) which is to be prepared; it is preferable for the solvent being used to have a good ionizing power. In one particularly advantageous embodiment, this solvent is formed by a certain quantity of the thioether itself.

Among the vulcanization agents capable of being used as a catalyst in a process carried out in accordance with the teachings of the invention, are the mercapto-benzthiazole derivatives, such as mercaptobenzthiazole, mercaptobenzthiazole disulphide, N-cyclohexyl-2-benzthiazolesulphenamide, 2-morpholinodithiobenzthiazole, 2-morpholinothiobenzthiazole, 1,3 - bis-(2-benzthiazoyl)-thiomethylurea, 2-(2,4-dinitrophenylthio)-benzthiazole, 2-benzthiazolyl-N,N'-diethylthiocarbamyl sulphide. Vulcanization agents of the dithiocarbamates and thiuram types can be used, examples of these being zinc dimethylthiocarbamate, tetramethylthiuram disulphide, and tetramethylthiuram sulphide. Derivatives of guanidine can also be used, such as diphenylguanidine and 1,3-di-o-tolyl-guanidine. Schiff's bases, i.e., aldehyde and amine combinations, are likewise suitable; it is, for example, possible to employ a mixture of butyraldehyde with aniline. Another series of vulcanization agents which can be used comprises the thio-bis-amines, particularly dithio-bis-diethylamine, dimethylamine, diisopropylamine, dioctylamine, di-B-ethylaminopropionitrile, dicyclohexylamino-acetonitrile, dipyrrolidine, dipiperidine, and N-dimorpholine. Amines, such as triethylamine, trimethylamine, and diaminodiphenylmethane, are also suitable for catalyzing the reaction in accordance with the invention. The catalysts can also be provided from the different thiocompounds, such as xanthates and derivatives of thiourea, for example, ethylene thiourea.

Although catalysts having various boiling points may be employed, it is preferable in each case to select a catalyst whose boiling point is considerably different from that of the thioether to be manufactured; in this way, it is easier for the product which is produced to be separated from the catalyst. The invention permits a very wide choice of catalysts, so that it is possible to use the conditions which are most advantageous in each particular case. For example, in the manufacture of ethyl sulphide, which boils at 92° C., it is well to employ catalysts boiling at a distinctly higher temperature, such as the aforementioned mercaptobenzthiazoles.

The proportions of catalyst to be employed can also vary within fairly large limits, the proportions by weight depending to some extent on the molecular weight of the catalyst chosen. In general terms, the catalyst concentration in the reaction medium may be of the order of 2% to 30% by weight, and preferably in the range from 5% to 15%; proportions of catalyst in the region of 10% give excellent results when starting with light olefins, such as ethylene, propylene, and butene.

The liquid phase, made up of the reaction medium, must be strictly maintained under a more or less high pressure when the olefin being used boils at a temperature lower than that at which the reaction takes place, i.e., generally between 100° C. and 200° C.; since, at the same time, a certain pressure is also required for maintaining the hydrogen sulphide in the reaction medium at this temperature, the inventive process is generally used under pressures which are higher than 10 atmospheres, although this does not necessarily rule out the possibility of working under lower pressures. In the most usual forms of the invention, the pressure is of the order of 10 atmospheres to 300 atmospheres, these values not being in any way limitative. The pressure limits are a function of the composition and the nature of the mixture of compounds at the reaction temperature; the influence of the pressure is of two types: on the one hand, it increases the speed of the reaction and, on the other hand, it permits operation in a liquid phase of desired composition.

Although the temperature of the reaction, in the new process, is generally between 100° and 200° C., it may in certain cases exceed these limits; when it is a question of producing thioethers from light olefins, the preferred temperature range is from 130° to 170° C.

According to another feature of the invention, the preparation is effected in the presence of an excess of hydrogen sulphide. It is interesting to note that this excess, which improves the conversion rate of the olefin, does not in any way modify the selectivity of the very specific reaction of the thioethers.

The manufacture, in accordance with the invention, can be carried out in any known apparatus.

In order to illustrate the invention, a few nonlimitative examples are given below.

Example I 20 g. of mercaptobenzthiazole, 7.5 g. of sulphur and 340 g. of $H_2S$ were introduced into an autoclave. The mixture was heated to 140°, ethylene was injected at a pressure of 100 atmospheres and this pressure was maintained throughout the entire operation. After 4 hours, the autoclave was cooled. The result was 900 ml. of a liquid which, when distilled, gave 790 g. of ethyl sulphide having a boiling point of 91 to 92° C.

Example II 10 g. of sulphur, 200 ml. of ethyl sulphide containing 13 g. of trimethylamine and 270 g. of $H_2S$ were introduced into an autoclave; the mixture was heated to 140°, ethylene was injected at a pressure of 100 atmospheres and this pressure was maintained for 3 hours. Under these conditions, 800 ml. of ethyl sulphide were obtained.

Example III

Under the same conditions as in Example I, a mixture of 20 g. of zinc dimethylthiocarbamate, 15 g. of benzoic acid, and 7.5 g. of sulphur was introduced as a catalyst. After operating for 6 hours, the same quantities of ethyl sulphide as in Example I were obtained.

Example IV

Under the same conditions as in Example II, 20 g. of dithio-bis-diethylamine in solution in 200 ml. of ethyl sulphide and 5 g. of sulphur were used as catalyst. The results were identical with those of Example II.

Example V

The steps of Example I were repeated, except that the addition of 7.5 g. of sulphur was omitted; that is to say, mercaptobenzothiazol was used alone as a catalyst. No ethyl sulphide was obtained.

Example VI

The steps of Example I were repeated, except that no mercaptobenzothiazol was introduced into the reaction mixture. Only 65 g. of ethyl sulphide were obtained.

Example VII

The general steps of Example I were repeated, but neither sulphur nor mercaptobenzothiazol were added to the reaction mixture. There was no formation of ethyl sulphide at all.

Example VIII

The following mixture was introduced into a reactor of stainless steel:

| | G. |
|---|---|
| Butyraldehyde | 18 |
| Anilin | 23.5 |
| Sulphur | 7.5 |

After the reactor had been closed, 400 g. of $H_2S$ were injected therein and then, 840 g. of propylene were carefully introduced, while the temperature was kept in the vicinity of 140° C. At the end of the introduction of propylene, the contents of the reactor were kept at the above temperature, under constant stirring, for about one hour. After cooling and distilling, 960 g. of propylsulphide were obtained. This product was analyzed with the following results:

Analysis of product: S, 27.7; C, 60.7; H, 11.6. Calculated for $C_6H_{14}S$: S, 27.1; C, 61.0; H, 11.88.

Example IX

The following were introduced into an autoclave of stainless steel: 832 g. of styrene, 10 g. of di-ortho-tolyl-guanidin, 5 g. of sulphur, 340 g. of $H_2S$. The mixture was heated for 3 hours at about 140°–150° C. The autoclave was then cooled, and 890 g. of diphenylethylsulphide were obtained, the boiling point of which, under 0.2 mm. Hg, is 117°–135° C.; the refraction index, $n_D^{20}$, of the compound is 1.5823.

Example X

The steps of Example I were repeated, except that the temperature was 120° C. After 4 hours of heating, only 235 g. of ethyl sulphide were obtained.

Example XI

The steps were similar to those carried out in Example I, but the temperature was raised to 180° C. the reaction became very violent. It was stopped by rapidly cooling the reactor, and after re-heating to 140° C., it went on with a great difficulty, probably due to the destruction of the catalyst. 370 g. of ethyl sulphide were obtained.

While it will be apparent that the illustrated embodiments of the invention herein disclosed are well calculated adequately to fulfill the objects and advantages primarily stated, it is to be understood that the invention is susceptible to variation, modification, and change within the spirit of the subjoined claims.

The invention having been thus described, what is claimed as new and desired to secure by Letters Patent is:

1. A proces for producing thioethers by the condensation of hydrogen sulphide with a substance selected from the class consisting of ethylene, propylene, and butene, consisting of the step of heating the hydrogen sulphide and the substance in the liquid state in the presence of a catalytic system made up of sulfur and a rubber vulcanization agent selected from the class consisting of mercaptobenzthiazoles, dithiocarbamates, thiurams, Schiff's bases, guanidines, thio-bis-amines, amines, xanthates, and thioureas.

2. A process as recited in claim 1, wherein the last-named class also includes dimethylamine, dimethylthiocarbamate salts, dithio-bis diethylamine, aniline, and di-ortho-tolyl guanidine.

3. A process as recited in claim 1, wherein the heating takes place at a temperature in the range from 100° to 200° C. under a pressure which is sufficient to maintain the reaction medium in the liquid state.

4. A process as recited in claim 1, wherein the proportion of each of the constituents of the catalytic system is in the range from 1% to 20% of the weight of the reaction medium.

5. A process as recited in claim 1, wherein the reaction medium comprises a solvent of hydrogen sulfide, the first-named substance, and the second-named substance.

6. A process as recited in claim 5, wherein the solvent is the thioether which is to be produced.

7. A process for producing ethyl sulfide, comprising the steps of:
  (a) forming a mixure of sulphur, hydrogen sulphide, and a vulcanization agent selected from the class consisting of mercaptobenzthiazoles, dithiocarbamates, thiurams, Schiff's bases, guanidines, thio-bis-amines, amines, xanthates, thioureas, and their derivatives,
  (b) introducing ethylene into the mixture,
  (c) maintaining the temperature of the mixture at about 140° C. and its pressure at about 100 atmospheres, and
  (d) separating ethyl sulphide from the resulting product by distillation.

References Cited

Naylor, Journal of Polymer Science, vol. 1, pp. 305–307 (1946).

CHARLES B. PARKER, *Primary Examiner.*

DELBERT R. PHILLIPS, *Assistant Examiner.*